US007006937B2

(12) United States Patent
Huntley

(10) Patent No.: US 7,006,937 B2
(45) Date of Patent: Feb. 28, 2006

(54) SYSTEM AND METHOD FOR INSPECTING ARTICLES OF MANUFACTURE

(75) Inventor: Peter Huntley, Ann Arbor, MI (US)

(73) Assignee: American Quality Assurance Corporation, Ann Arbor, MI (US)

( * ) Notice: Subject to any disclaimer, the term of this patent is extended or adjusted under 35 U.S.C. 154(b) by 0 days.

(21) Appl. No.: 10/858,038

(22) Filed: Jun. 1, 2004

(65) Prior Publication Data

US 2005/0267704 A1    Dec. 1, 2005

(51) Int. Cl.
*G06F 19/00* (2006.01)
(52) U.S. Cl. ....................................... 702/89
(58) Field of Classification Search ..................... None
See application file for complete search history.

(56) References Cited

U.S. PATENT DOCUMENTS 4,853,776 A    8/1989  Itaya et al.
5,774,177 A    6/1998  Lane
6,462,820 B1   10/2002 Pace et al.

*Primary Examiner*—Michael Nghiem
(74) *Attorney, Agent, or Firm*—Reising, Ethington, Barnes, Kisselle, P.C.

(57) ABSTRACT

An inspection system for an article of manufacture and method of using the same, assists an inspector in the inspection of a wide variety of articles for conformance to a pre-selected set of requirements particularly when checking is done by human senses and the manual application of measuring devices. A computer server is utilized in conjunction with the inspector to impose constraints and discipline on the inspector's actions. Such constraints include enforcing a standardized sequence for checking each of a pre-selected set of article requirements depending on the fabric article type, limiting the available responses by which the inspector can record the results of the observation, and enforcing a minimum lapsed time for inspection of certain article requirements.

21 Claims, 9 Drawing Sheets

SYSTEM AND METHOD FOR INSPECTING ARTICLES OF MANUFACTURE

TECHNICAL FIELD

The present invention relates generally to an inspection system for articles of manufacture and more particularly, to a computerized inspection system for fabric articles and a method of using the same.

BACKGROUND OF THE INVENTION

In the manufacture of products, textile or similarly sewn and/or fabricated articles in general, after the articles have been assembled, they are inspected for defects and abnormalities visible to the unaided human eye. Inspection is typically accomplished by passing the article through a well-lit area where an inspector can view the article for any one or more of a series of nonconformities. The inspection process for articles such as garments typically includes a review of fabric color, texture, dying or printing, pattern direction, fabric sheen, stitching, label condition and location, presence of dirt, fabric dimensions, and the like. Unfortunately, stopping the assembly line is inefficient and costly from a manufacturing standpoint. Inspectors are not infallible and may unintentionally omit a necessary inspection step of the series of observations to be made on any one article. Yet further, the inspection process can be monotonous and tedious leading some inspectors to rush an inspection, and thereby miss unacceptable defects. Consequently, the thoroughness of the inspection may vary between inspectors leading to variations in product quality.

SUMMARY OF THE INVENTION

An inspection system and method of using the same, assists an inspector in the inspection of a variety of manufactured articles for conformance to a pre-selected set of requirements particularly when checking is done by means of human senses and the manual application of measuring devices. This inspection system is particularly useful where extensive manual labor, and therefore variability, is an essential part of the manufacturing process, such as in the production of articles of apparel, household textile products, shoes and apparel accessories, costume jewelry, hand-painted crockery and similar items, all characterized by the necessity to inspect most of the pieces produced in order to control and assure production quality.

Preferably, a network consisting of at least one inspection station plus a computer server is utilized in conjunction with at least one inspector to impose constraints and discipline on the inspectors' actions. Such constraints include enforcing a standardized sequence for checking a pre-selected fabric article type, limiting the available responses by which the inspector can record the results of the observation, and enforcing a minimum lapsed time for inspection of certain article requirements. The inspector interfaces with the computer server via at least one remote inspection station each having a monitor, keyboard, pointer and preferably a bar-code scanner capable of reading labels attached to the articles of manufacture.

Preferably, the attached label of each article to be inspected has identifiers indicating the article type and an identifier which is unique to the particular article being inspected. These identifiers are scanned into the computer by the inspector. The server automatically uploads the corresponding inspection procedure, specific to the type of article, for the inspector to follow. Each feature of the article requiring inspection is covered by the appropriate inspection procedure and the server preferably prompts the inspector to select various pre-programmed choices as inspection results or comments. Preferably the computer has an internal timer which sets a minimum interval for observation of selected article features for inspection. Depending upon the inspector's measurements and selected comments, the article is advanced to the next procedure sub-routine, possibly flagged for rework, or rejected which terminates the remainder of the inspection.

Objects, features and advantages of this invention include a computerized system which imposes constraints and discipline upon an inspector, thus providing consistent inspection results between a variety of inspectors. Furthermore, the system and method improve manufacturing quality, manufacturing efficiency and organizes product quality records for easy reference. Yet further, the system is robust, portable and relatively inexpensive requiring minimal manpower to operate and maintain.

BRIEF DESCRIPTION OF THE DRAWINGS

The presently preferred embodiment of the invention is disclosed in the following description and accompanying drawings, wherein.

DESCRIPTION OF THE PREFERRED EMBODIMENT

Figure 1:
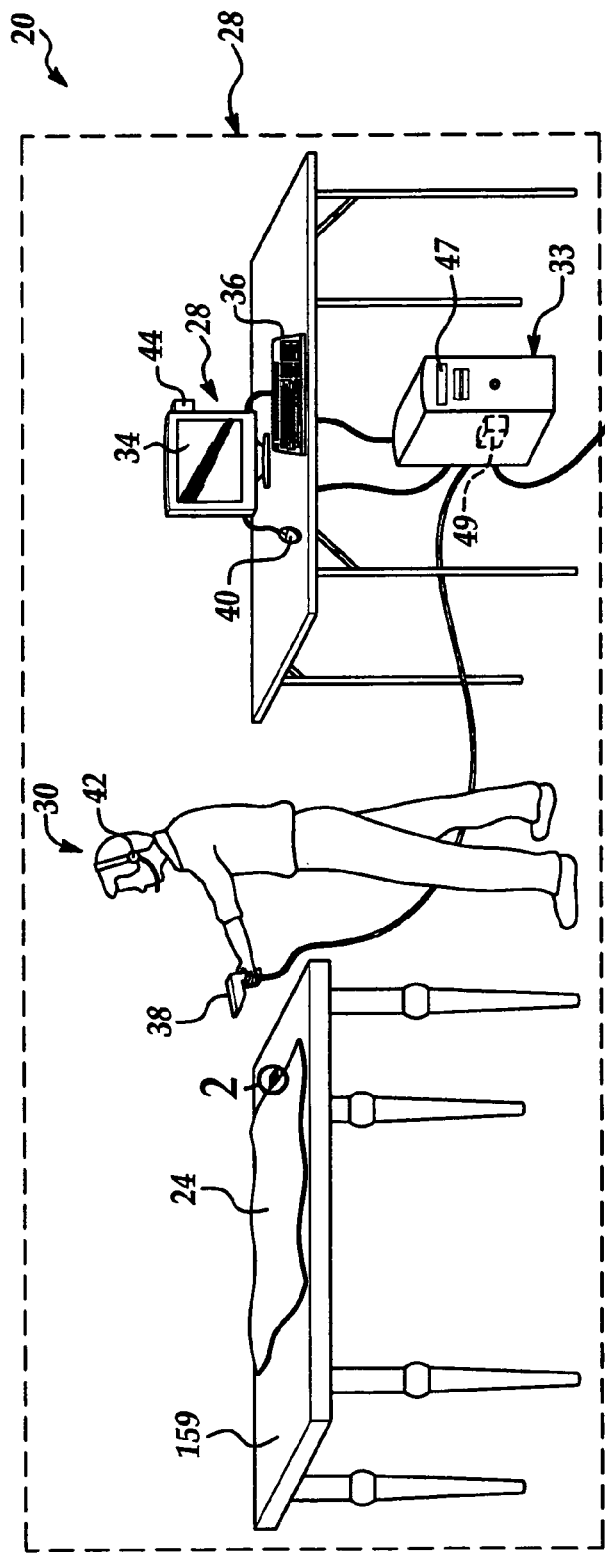
FIG. 1 is a perspective view of an inspection system for an article of manufacture of the present invention.

Referring in more detail to the drawings, FIG. 1 illustrates an article of manufacture inspection system 20 which is preferably portable and assists an inspector 30 in the task of checking numerous production features of an assembled or manufactured article 24 for conformance to a set of requirements, and particularly where checking is done by means of the human senses or the manual application of measuring devices. A computer server or server station 26 interfaces with at least one inspection or audit station 28 and together control the actions of the inspector 30 throughout an inspection procedure 32 while recording the results of each observation.

The inspection system 20 significantly improves the accuracy of conventional inspection procedures, by imposing constraints and discipline on the inspector's actions. These constraints include: first, enforcing a standardized sequence for checking the individual requirements of the assembled or manufactured article 24; second, limiting the available responses by which the inspector 30 can record the results of the observation; and third, enforcing a minimum lapsed time for the inspection of some of the specific feature requirements of the article 24. By introducing a tighter control of the inspection process, the possibility of article defects escaping the inspector's attention is significantly reduced.

Figure 2:
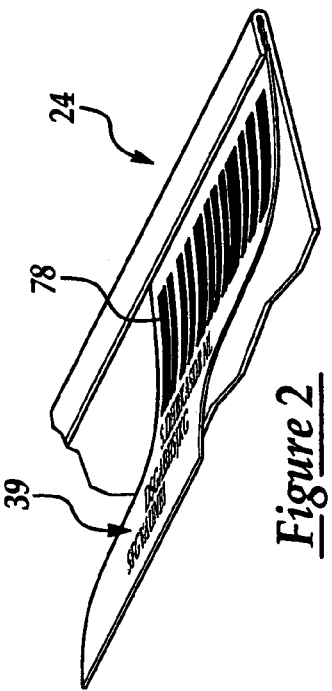
FIG. 2 is a perspective view of a label of the article being inspected.

The inspection stations 28 are point-of-sale type, POS, systems forming a star configuration when combined with the server station 26. The server station 26 generally has a higher level of configuration than the inspection stations 28 and stores test procedures or software for the inspections and data from the inspections. Each inspection station 28 preferably has a networked computer 33 for executing the procedure 32 uploaded from the server 26, a computer monitor 34, a keyboard 36 for entering alpha-numeric data, a bar-code scanner 38 for identifying the article 24 from an attached label 39 (as best shown in FIG. 2), a pointing device 40 such as a mouse, and a microphone device 42, preferably of a wireless type having a receiver 44, for recording verbal comments. The monitor 34 preferably is of a touch-screen type to further facilitate interaction between the server station 26 and the inspector 30. The scanner 38 preferably is a rugged charge-couple device and of a RS232 type. The system 20 is equipped with an uninterruptible power supply 45, and an internal clock or integral software timer 49 of the computer 33 for enforcing discipline upon the inspector 30. The computer server 26 is also equipped with a tape or disc back-up-system 47. Preferably, each inspection station 28 has a dedicated computer 33 because the communication cables 35 routed to the server 26 are relatively simple in design. However, with added communication links, the computer 33 can be omitted and the computer server 26 can be modified to perform the executing functions otherwise performed by computer 33 of the inspection station 28.

Upon system start-up, each inspection screen 34 preferably displays the name of the factory, the identifying number of the inspection station 28, the date and time. Each inspector 30, after logging in with a name and password on the inspection station 28, is preferably allowed certain user rights depending on the inspector's level of authority. These rights are assigned and loaded into the computer 33 preferably by an administrator 46.

Figure 3:
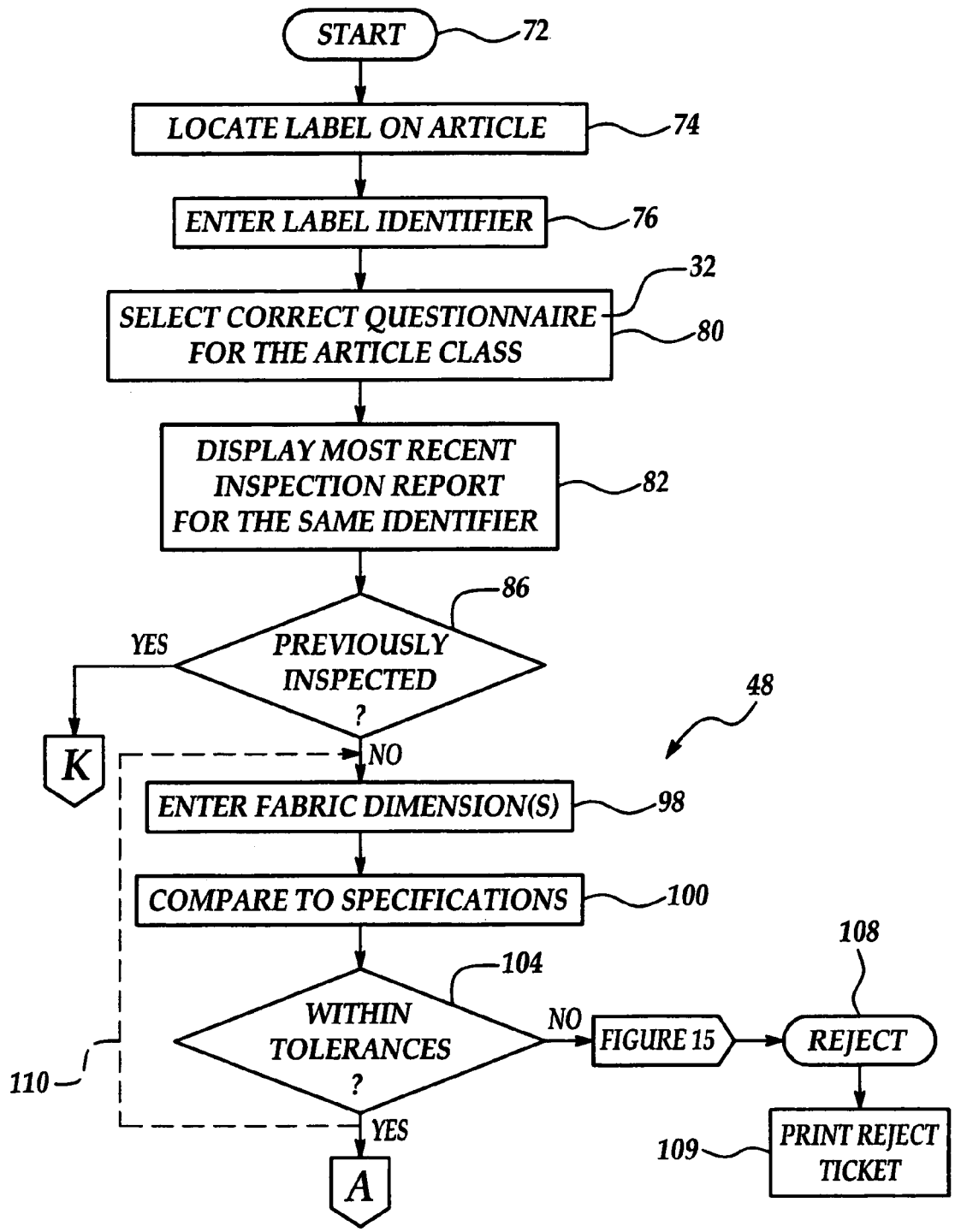
FIG. 3 is a first portion of a flow chart depicting a series of dimensional inspections of the manufactured article.
Figure 4:
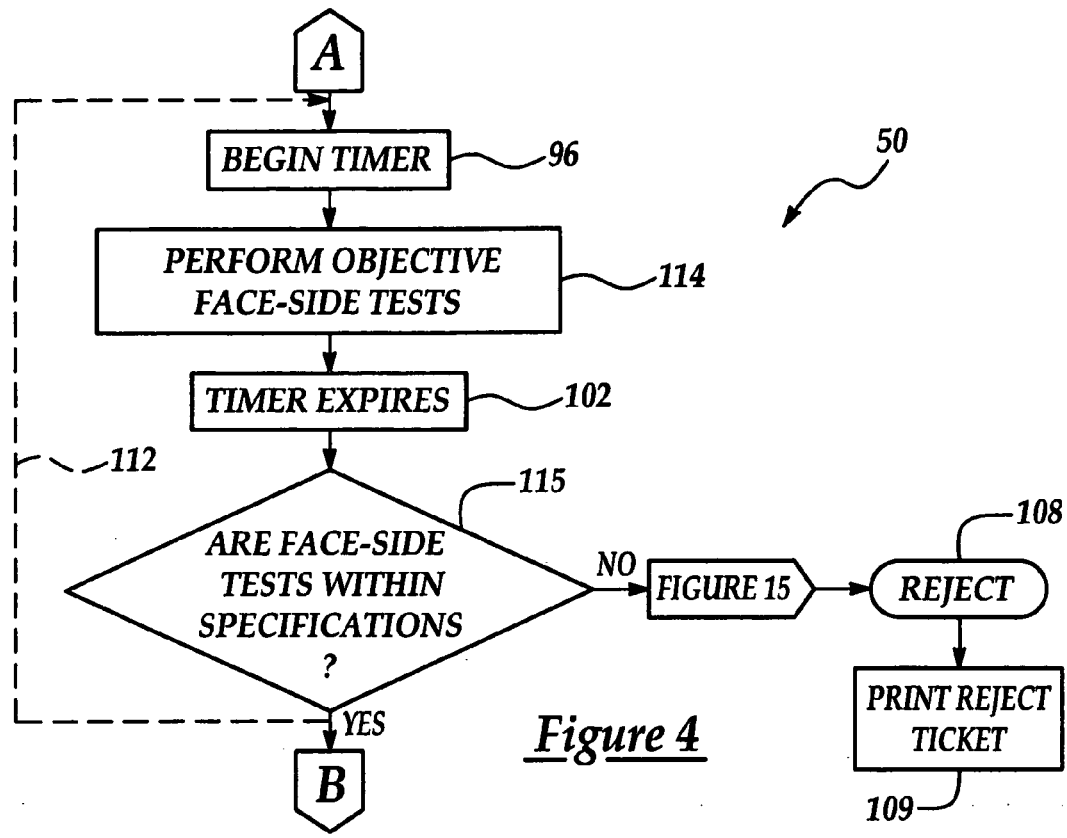
FIG. 4 is a second portion of the flow chart depicting a series of objective face-side tests.
Figure 5:
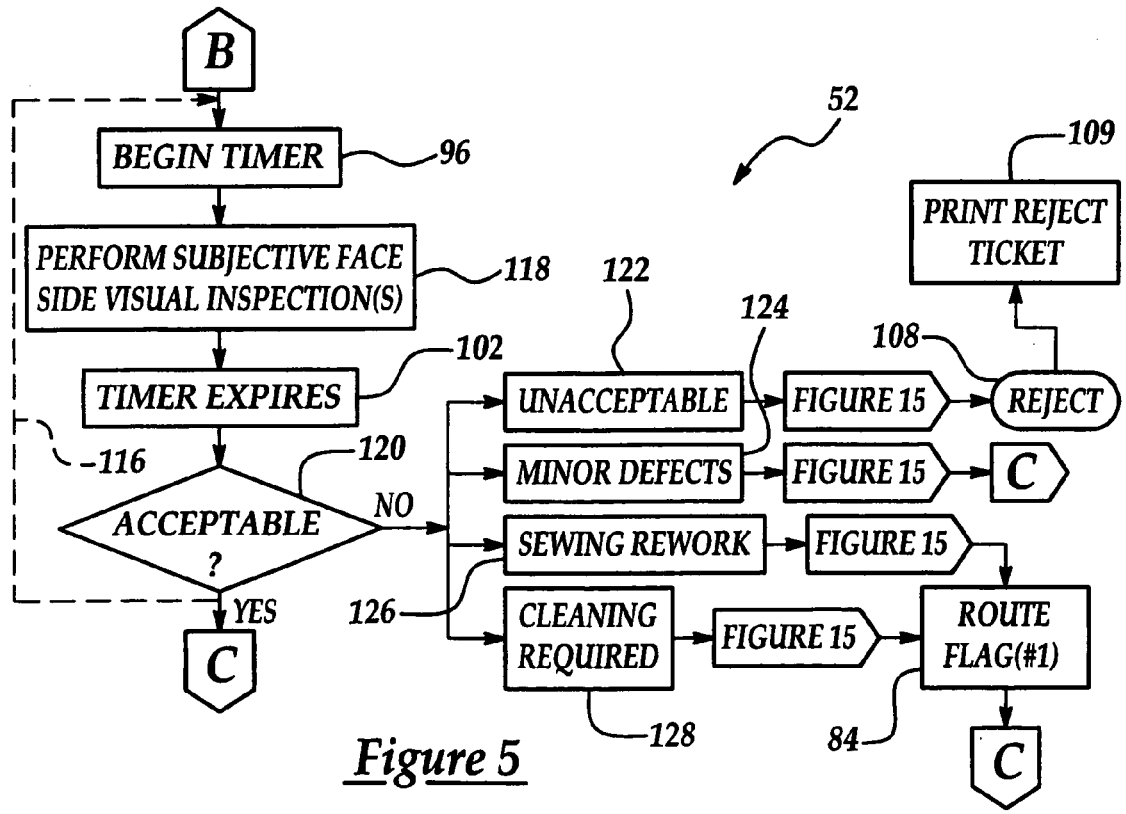
FIG. 5 is a third portion of the flow chart depicting a series of subjective face-side visual inspections.
Figure 6:
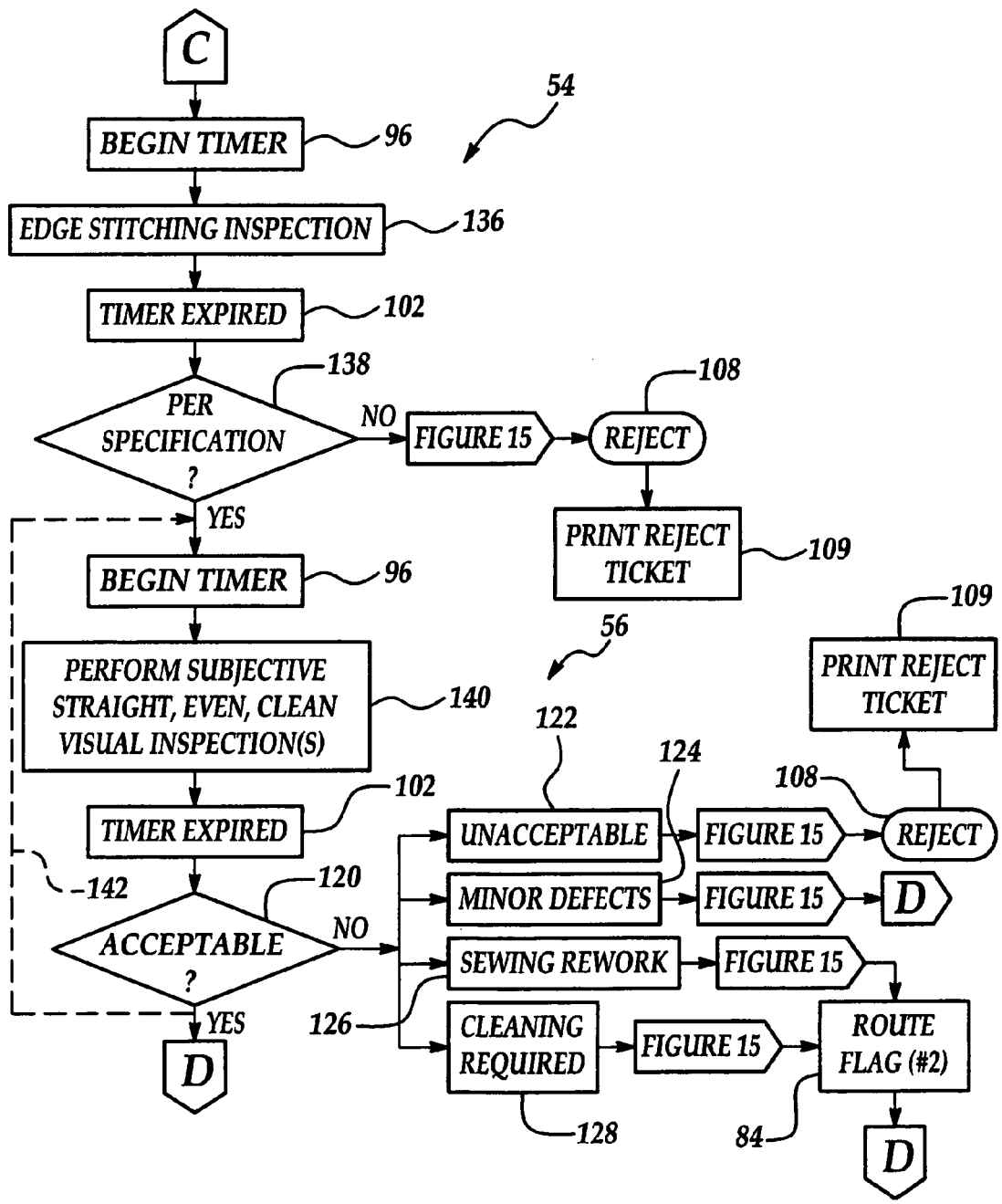
FIG. 6 is a fourth portion of the flow chart depicting a series of stitching inspections.
Figure 7:
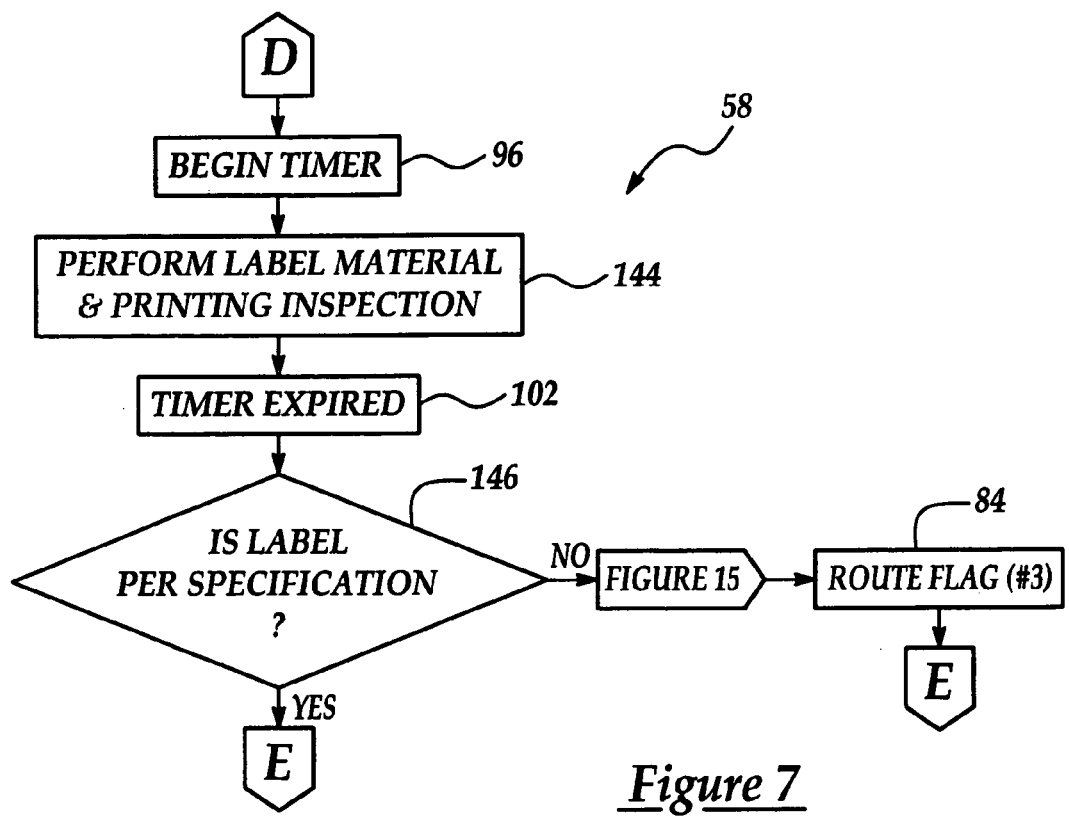
FIG. 7 is a fifth portion of the flow chart depicting label material and printing inspection.
Figure 8:
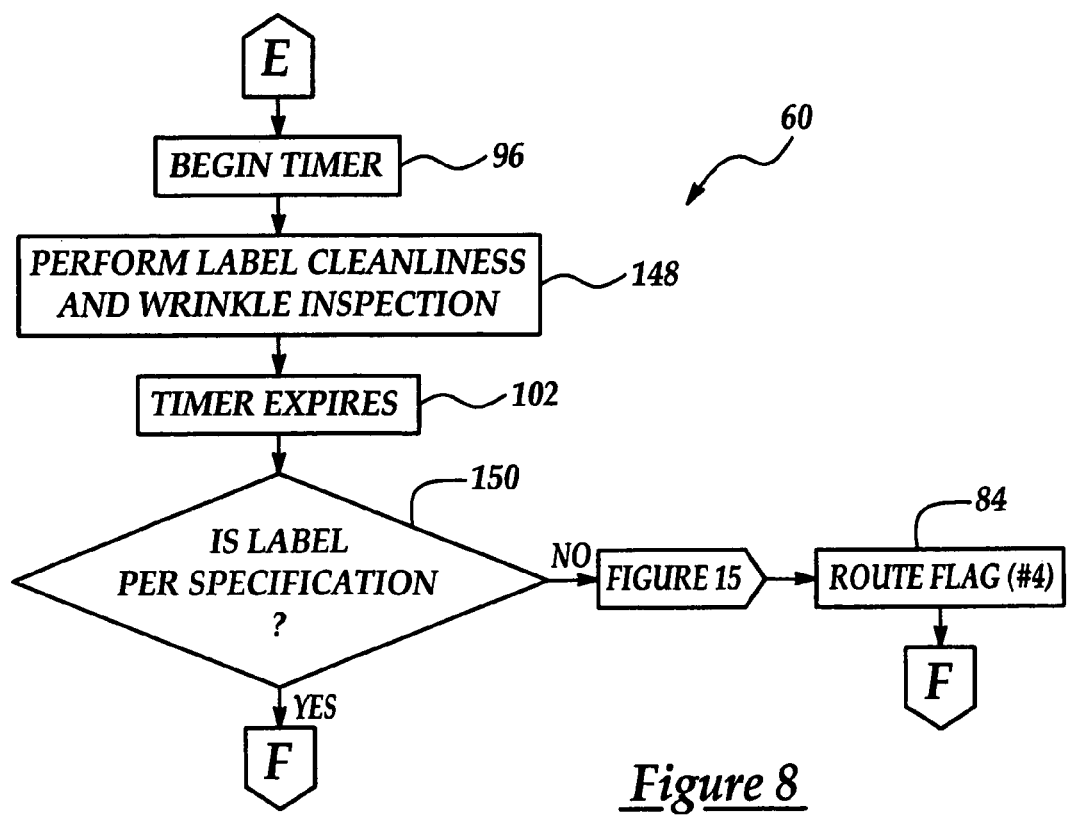
FIG. 8 is a sixth portion of the flow chart depicting a label cleanliness and wrinkle inspection.
Figure 9:
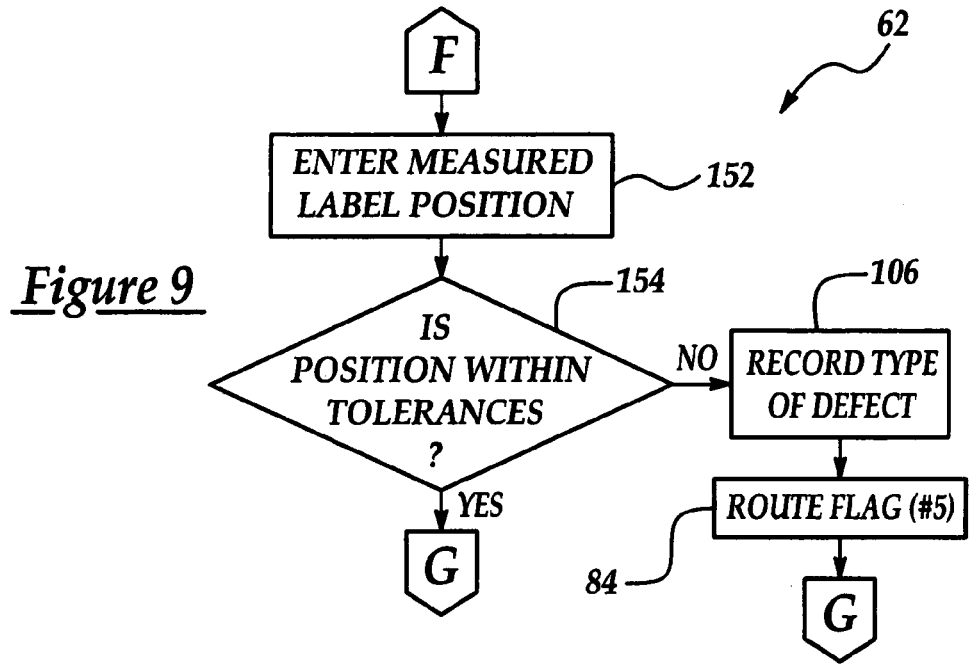
FIG. 9 is seventh portion of the flow chart depicting a measured label position inspection.
Figure 10:
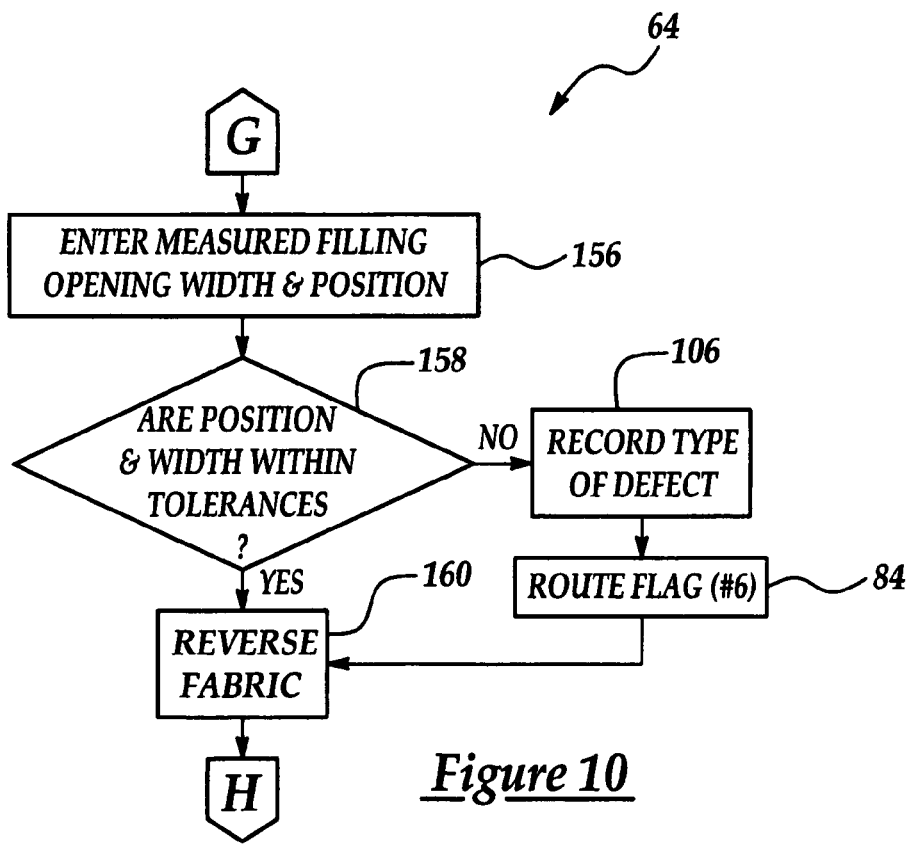
FIG. 10 is an eighth portion of the flow chart depicting a filling opening position and measured width inspection.
Figure 11:
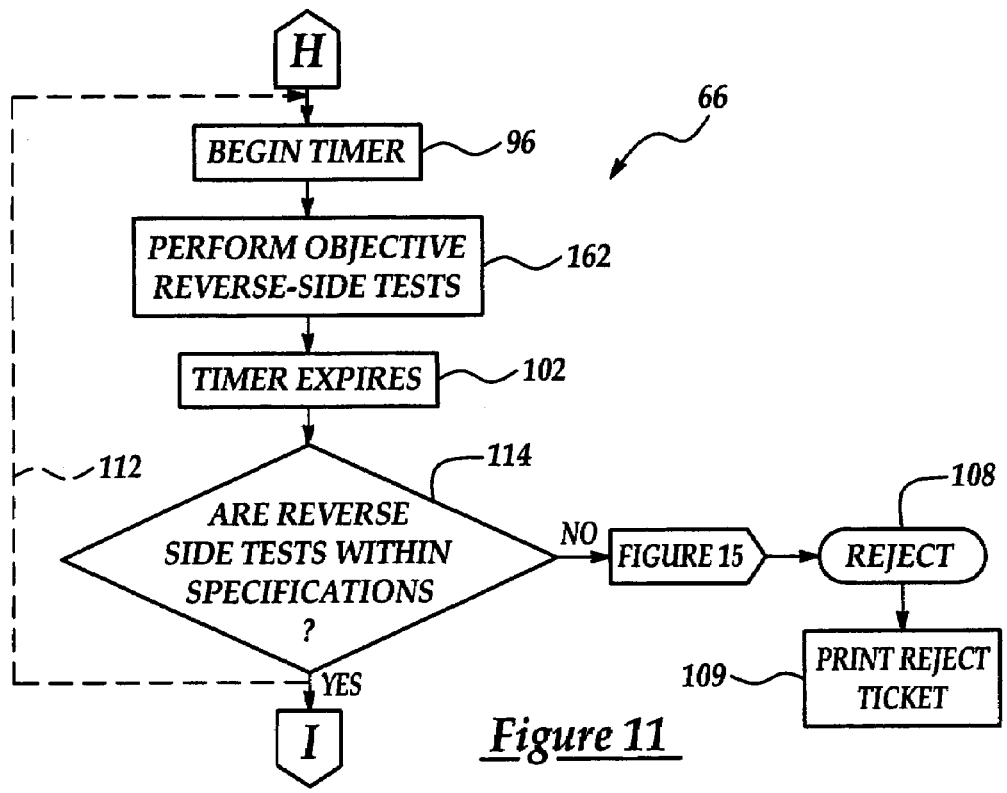
FIG. 11 is a ninth portion of the flow chart depicting a series of objective reverse-side tests.
Figure 12:
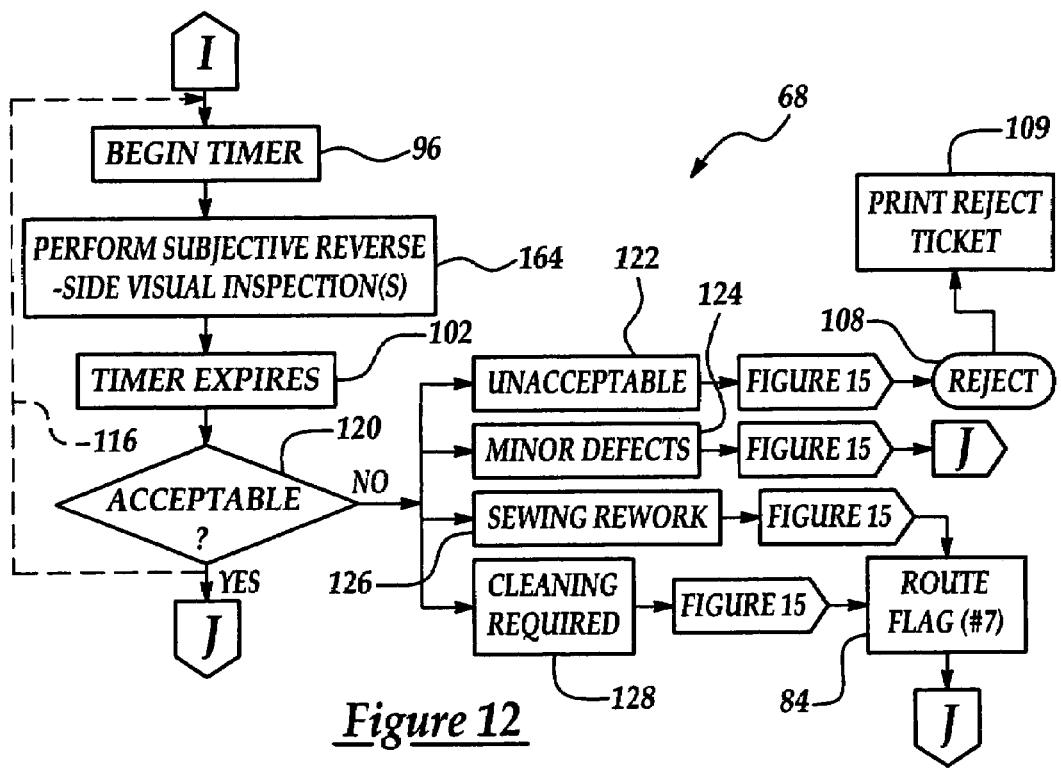
FIG. 12 is a tenth portion of the flow chart depicting a series of subjective reverse-side visual inspections.
Figure 13:
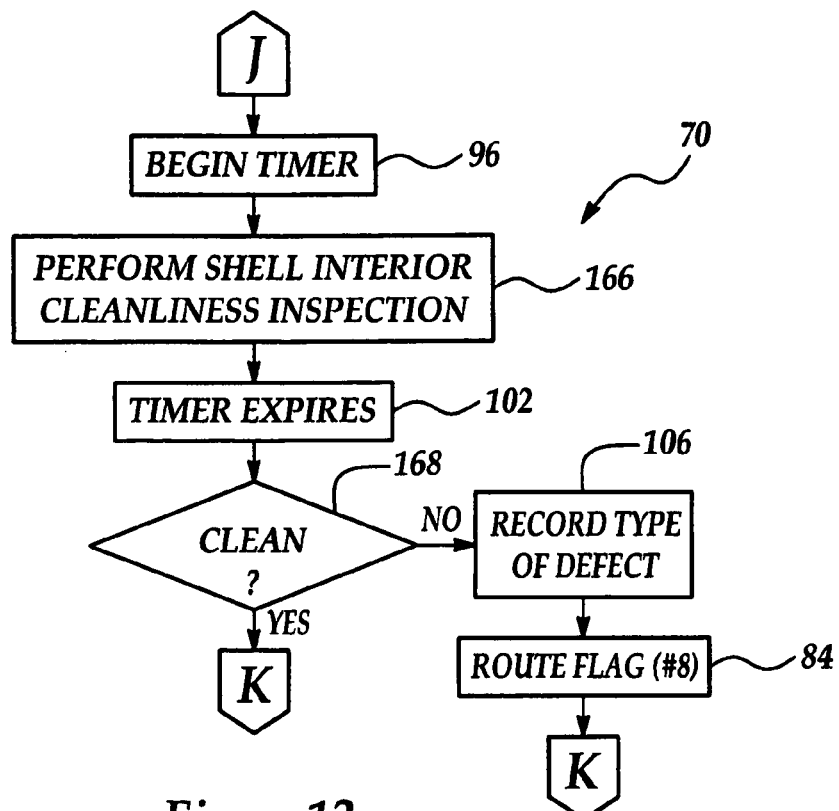
FIG. 13 is an eleventh portion of the flow chart depicting an interior cleanliness inspection.

Referring to FIGS. 3–15, the inspection procedure 32 is defined for each type of article 24 to be inspected and includes the checking of all the specified article features in an efficient and fixed sequence. For purposes of example, the article 24 is a garment or fabric manufactured by the textile industry. When the article or garment 24 arrives for inspection, its type is entered into the system 20 via the scanner 38 and the appropriate procedure 32, pre-stored by the administrator 46, is displayed on the screen 34. The procedure 32 preferably has a series of sequential steps or sub-routines, each step addresses one of the garment features or requirements. For instance; FIG. 3 depicts a series of dimension-checking steps or sub-routines 48 for an assembled garment, FIG. 4 depicts a series of objective face-side test sub-routines 50, FIG. 5 depicts a series of subjective face-side visual sub-routines 52, FIG. 6 depicts an edge stitching step 54 and a series of subjective face-side sewing sub-routines 56, FIG. 7 depicts a label material and printing step 58, FIG. 8 depicts a label cleanliness and wrinkle step 60, FIG. 9 depicts a measured label position step 62, FIG. 10 depicts a measured filling opening step 64, FIG. 11 depicts a series of objective reverse-side test sub-routines 66, FIG. 12 depicts a series of subjective reverse-side visual sub-routines 68, and FIG. 13 depicts a shell interior cleanliness step 70.

More particularly, and referring to FIG. 3, the fabric inspection procedure 32 starts when the inspector 30 initializes 72 the system 20 by logging-in. Assuming the inspector 30 has the necessary permission(s) pre-programmed by the administrator 46, the inspector locates 74 the label 39 on the assembled garment 24 and reads or enters 76 several bar codes 78 read off of the label by the scanner 38. Preferably, the first label identifier or bar code includes a purchase order number, a product type number and a product class code used to identify the type of assembled fabric article and its size. The second bar code identifies the sewing machine operators who made the garment 24. Another bar-code number to be read-in gives the unique serial number of the particular garment being inspected.

After identification, the computer 33 then selects 80 the necessary inspection procedure or questionnaire 32 for the particular product class, displays 82 the most recent inspection report for the same serial number, if any, and if no previous inspection, sets all routing flags 84 to zero. If the garment 24 was previously inspected, the computer 33 automatically advances the inspection of the garment 24 to a particular sub-routine of the procedure 32 for re-inspection while skipping over sub-routines or steps previously inspected and accepted. The computer 33 knows where to advance the inspection by reading a series of settings of the routing flags 84 as recorded from the previous inspection report and uploaded from the server 26. Some articles will have previous inspection reports as a result of some correctable defects having been found in previous inspections, and it is the purpose of the subsequent inspection to insure all previously-noted correctable defects have in fact been corrected. The purpose of the routing flags 84 is to control the flow of execution of the procedure 32 during the subsequent inspection such that each correctable defect is again inspected in proper sequence, while steps unlikely to yield a different result, such as a physical measurement, are not repeated.

Figure 15:
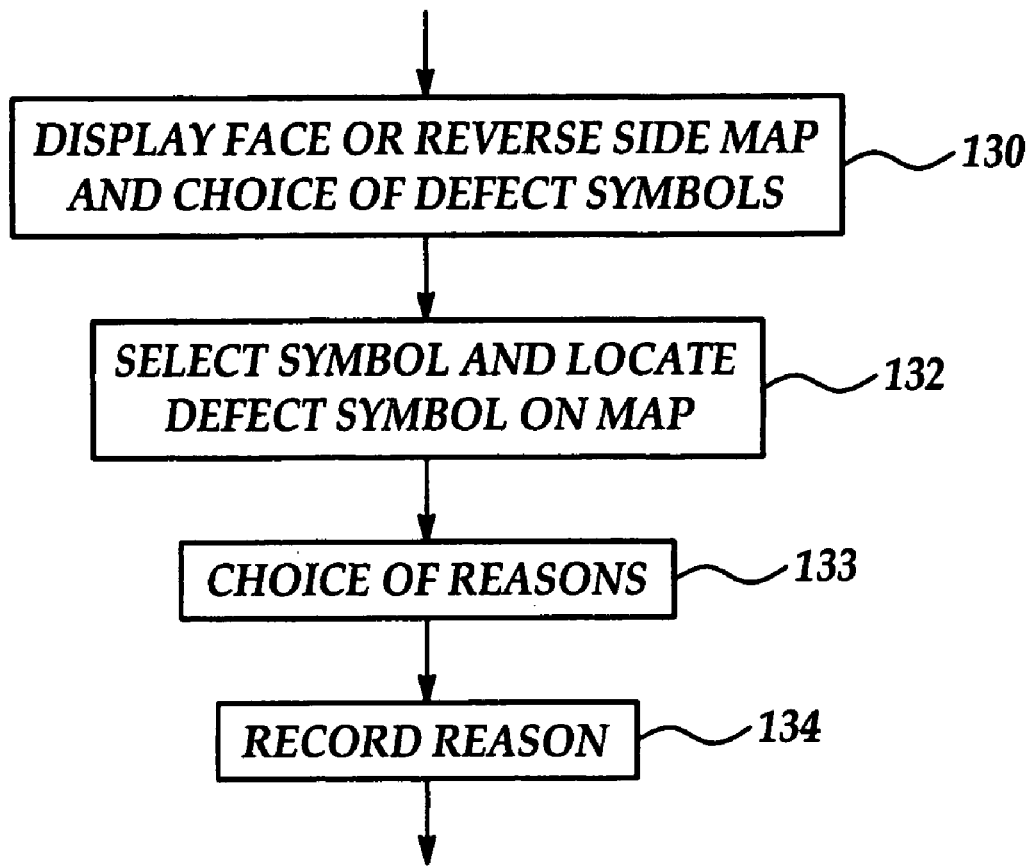
FIG. 15 is a thirteenth portion of the flow chart detailing a sub-routine controlled by software and requiring operator input.

If the garment 24 has not been previously inspected 86, the computer 33 advances the garment 24 to sub-routine 48 of the procedure 32. The sub-routine 48 then requires the inspector 30 to enter a garment dimension 98 such as a width. The computer compares 100 the entered dimension with specifications pre-loaded as part of the procedure 32. The computer determines 104 and alerts the inspector 30 if the measured width falls outside of pre-determined tolerances. The cases where a measurement falls outside of pre-determined tolerances cause automatic rejection 108 of the garment, the computer 33 automatically records the reason for rejection, and a reject ticket 109 is preferably printed. The inspector 30 may record additional comments. As best shown in FIG. 15, the additional comments preferably include a selection of programmed choices 133 appearing on the touch-screen monitor 34 and may also include a field for custom entry by the inspector 30 utilizing the keyboard 36 or microphone 42. If the garment width falls within the pre-determined tolerances, the computer follows a sub-loop 110 to instruct the inspector 30 to measure and enter another dimension, such as length, thus repeating the same sub-routine 48. When all dimensions are entered, and provided all fall within the pre-established tolerances, the garment 24 is advanced by the computer 33 to sub-routine 50 of the procedure 32.

Referring to FIG. 4, the objective face-side test inspection sub-routine 50 has sub-loops as indicated by identifying numeral 112 which include individual objective product face-side inspections 114 for color accuracy, pattern direction, sheen, and the like. As this is one of the steps in which inspector's haste could impair the accuracy of the inspection, the computer initiates 96 the internal timer 49 for each sub-loop 112 assuring a standard and sufficient amount of time is spent on each observation 114. Progress onto the next sub-loop or inspection step is prevented due to the computer's refusal to accept any inputs via the monitor 34, pointing device 40, keyboard 36, bar-code scanner 38 or microphone 42 until expiration of the pre-programmed minimum inspection duration for the sub-loop or step 114 in question. During each sub-loop 112, the inspector 30 views the face-side of the garment 24 and enters 115, for instance, the colorimetric data from instrument readings or visual observation of pattern direction or sheen level, such observations preferably entered from a selection of pre-programmed choices which conveniently appear on the screen 34. After the internal timer 49 for the sub-loop 112 expires 102, the computer 33 accepts the inspector's input for that sub-loop 112 and automatically determines if the objective face-side test data entered falls within the pre-programmed specifications. When the garment 24 under inspection merits rejection 108, this information as well as the cause for rejection are entered, automatically, into the inspection record for the garment 24. The inspector 30 is alerted and records comments or reasons 134 preferably by selecting from pre-programmed choices 133, as best shown in FIG. 15. The inspection procedure 32 of that particular rejected garment 24 is terminated and a rejection ticket 109 is printed. If all of the entered data from each sub loop 112 falls within the specifications, the garment 24 advances to sub-routine 52 of procedure 32.

Referring to FIG. 5, the subjective face-side visual inspection sub-routine 52 includes sub-loops as indicated by identifying numeral 116 which include individual subjective article face-side inspections 118, such as, in the case of an assembled garment, inspections for dying defects, weaving defects, dirt marks, and the like. Similar to sub-routine 50, the computer initiates 96 the timer 49 for each sub-loop 116 assuring a standard and sufficient amount of time is spent on each subjective inspection 118. The inspector 30 views 118 the face-side of the garment 24 and after the timer expires 102, the inspector 30 enters into the computer 33 his determination of acceptability 120 of the particular inspected feature of the garment 24. If the feature is accepted, the sub-loop 116 repeats for the next subjective feature, if the feature is not accepted, the inspector 30 is prompted to choose between unacceptable 122, minor defects 124, sewing rework required 126 and or cleaning required 128.

In sub-routine 52, if the inspector 30 chooses unacceptable 122, the computer conveniently provides a display map of the face-side and a choice of symbols indicating type of defect 130, as best shown in FIG. 15. The inspector 30 then utilizes the mouse 40 to indicate the location of the defect on the map and selects and locates a symbol on the map 132 then selects a choice of reasons 133 which appear on the touch-screen monitor 34. The computer 33 records 134 this data and the garment 24 is rejected 108 and a reject ticket 109 printed, thus terminating the remainder of the test procedure 32.

In sub-routine 52, if the inspector 30 chooses minor defects 124 the garment 24 is not rejected 108, but instead, the computer conveniently provides a display map and a choice of symbols indicating type of defect 130, as best shown in FIG. 15. The inspector 30 then utilizes the mouse 40 to indicate the location of the defect on the map with a symbol indicating the type of defect and selects 133 a comment or reason preferably from a choice of comments or reasons which appear on the touch-screen monitor 34. The computer 33 records 134 this data and the product 26 is advanced to the next sub-loop 116 or if sub-routine 52 is complete, to the next procedure step 54.

Again in sub-routine 52, if the inspector 30 chooses sewing rework 126 or cleaning required 128, or both, the garment 24 is not rejected 108, but instead, is flagged 84 for rework after final inspection. Similar to minor defects 124, the computer conveniently provides a display map of the face-side and a list of symbols to indicate different types of defect 130, as well as a choice of reasons 133, as best shown in FIG. 15. The inspector 30 then utilizes the mouse 40 to indicate the location of the defect on the map with a symbol indicating the type of defect 132 and selects a reason preferably from a choice of reasons which appear on the touch-screen monitor 34. The computer 33 records 134 this data and the garment 24 is appropriately flagged 84. The garment 24 is then advanced to the next sub-loop 116 or if sub-routine 52 is complete, to the next procedure step 54.

Referring to FIG. 6, the computer begins the edge stitching step 54 of the procedure 32 by initiating 96 the timer. The inspector 30 then views 136 the garment 24 for the proper stitching and after the timer expires 102, enters acceptability 138 per specification. If the edge stitching does not meet specifications, the computer 33 prompts the inspector 30 to record the location of the defect and the reason for rejection preferably from pre-programmed choices as shown in FIG. 15 and then rejects 108 the garment 24 and prints a reject ticket 109. If the stitching meets the specification, the garment 24 advances to sub-routine 56.

Referring again to FIG. 6, sub-routine 56 is generally the same as sub-routine 52 except that that the subjective face-side visual requirements 118 of sub-routine 52 is changed to a subjective visual requirements 140 for stitching. Like sub-routine 52, sub-routine 56 includes a sub-loop 142 for specific inspections of stitching features such as straightness, even, cleanliness, and the like. After each stitching feature is inspected, and provided the garment 24 is not rejected 108, the garment is flagged 84 when necessary and advanced to procedure step 58.

Referring to FIG. 7, initiating 96 the timer by the computer 33 begins the procedure step 58. The inspector 30 visually inspects the label material and printing 144, the timer expires 102, and the inspector decides 146 if the label 39 and printing 78 meet specifications. The inspector 30 registers his decision by means of the touch-screen monitor 34. If not, the computer 33 via the touch-screen monitor 34 displays 130 a map and a choice of defect symbols, as best shown in FIG. 15. The inspector 30 uses the mouse 40 to locate the defect on the map and selects one of the pre-programmed map symbols which represents the defect. The computer 33 records 134 this data and reasons for rework, the garment 24 is route flagged 84, and the product advances to sub-routine 60 of the procedure 32. If the inspector 30 decides 146 that the label 39 meets specifications set forth by the computer 33 and uploaded from server 26, the garment 24 advances to procedure step 60 without being flagged.

Referring to FIG. 8, procedure step 60 is generally the same as procedure step 58 except that the label is visually inspected 148 for cleanliness and wrinkle free conditions instead of being visually inspected 144 for material and printing. After the inspector 30 decides 150 whether the label meets specifications, the garment 24 advances to procedure step 62.

Referring to FIG. 9, the inspector 30 measures 152 the label position and enters the result by means of keyboard 36. The computer 33 decides 154 if the label 39 is within pre-programmed tolerances provided by the computer. If not, the computer 33 records the type of defect 106, the computer 33 then flags 84 the garment 24, and the product is advanced to procedure step 64. An incorrectly positioned label is described here as an example of the types of defect which can be corrected by rework, and is not a cause for rejecting the garment. If the label 39 is within tolerances, the garment 24 is advanced to procedure step 64 without being flagged by the computer 33.

Referring to FIG. 10, procedure step 64 is particularly applicable if the assembled garment 24 is going to be stuffed with a filling material. Procedure step 64 is generally the same as procedure step 62 except the width and position of the filling opening are measured 156 instead of the label position 152. The computer records 158 if the opening width is within the pre-programmed tolerances uploaded from the server 26. If not within tolerances, the computer 33 records the type of defect 106, the garment 24 is flagged 84 by the computer, and the garment is advanced to the next sub-routine 66 by the computer. If the garment 24 is within tolerances, the garment is advanced to the next sub-routine 66 without being flagged.

Referring to FIG. 11, the monitor 34 displays the prompt to the inspector 30 to reverse (turn over) the garment 24 on the inspection table 159, and the inspector 30 indicates to the computer 33 via the touch-screen monitor 34 when this action is completed. Sub-routine 66 is generally the same as sub-routine 50 except that the garment 24 is reversed, hence, the inspector 30 performs a series of objective tests 162 on the reverse side instead of on the face side of the garment 24. Provided the garment 24 is not rejected 108, the computer then advances the garment to sub-routine 68. Referring to FIG. 12, sub-routine 68 is generally the same as sub-routine 52 except that the garment 24 is reversed, hence, the inspector 30 performs a series of subjective visual inspections 164 on the reverse side instead of on the face side of the garment 24. Provided the garment 24 is not rejected 108, it is flagged 84 or not, and advanced to the next procedure step 70 by the computer 33.

Referring to FIG. 13, initiating 96 the timer by the computer 33 begins the procedure step 70. The inspector 30 visually inspects 166 the garment or shell 24 for interior cleanliness, the timer expires 102, and the inspector decides 168 if the interior of the shell is clean. If not, the computer 33 records the type of defect, the garment 24 is flagged 84, and the garment is advanced to procedure step 88. If the inspector 30 decides 168 that the interior shell is clean, the garment 24 advances to procedure step 88 without being flagged.

Figure 14:
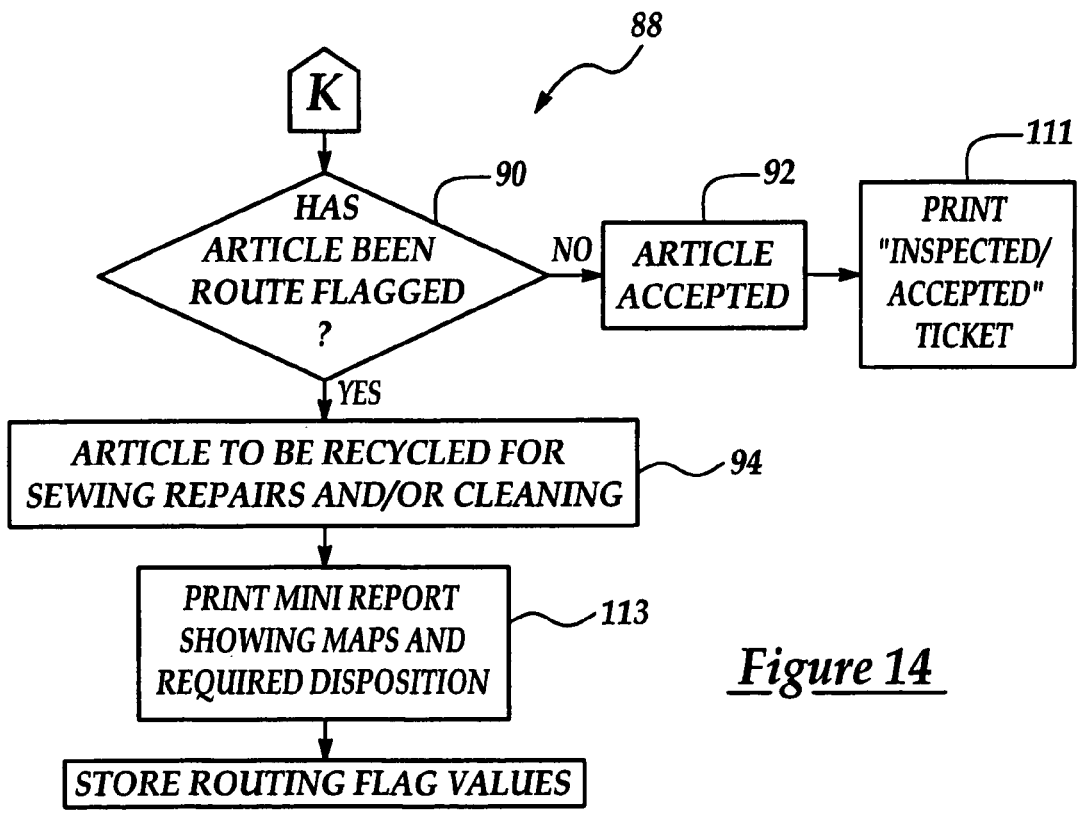
FIG. 14 is a twelfth portion of the flow chart depicting the article routing if flagged.

Referring to FIG. 14, the flag procedure step 88 consists of a determination 90 by the computer 33 as to whether the garment 24 has been route flagged 84, and if not, the garment is advanced to acceptance 92 and an acceptance ticket 111 is printed, and if yes, the garment is routed for recycling 94 which entails printing of a report 113 showing maps and required disposition, and sewing repairs and/or cleaning. The flags 84 in terms of server software are preferably binary variables. The garment 24 has been route flagged if at least one of the series of different flags 84 equals one. The flag settings 84 are stored as part of the database record for reference at the time of the next inspection, as the sequence of sub-routines activated during the next inspection will depend on the stored flag setting values. The database record and the printed inspection report 113 show the type of defects found, the location of the defects, and the type of rework required. For specific instances as previously described, the screen 34 will show an outline of the garment 24 as it currently appears on the inspection table and the location of the defect. The face-side and reverse-side diagrams with the defect location also form a part of the inspection record and are included in the report printout 113. For unique identification of defect location, face-side and reverse-side must be clearly distinguished by definition, such as a specific text or graphic printed on one side of the label 39 but not on the other. Because the garment may have more than one type of defect calling for rework 94, each type of defect is given a distinctive symbol or letter by which the nature of defect and corrective action, as shown on the diagram, may be recognized.

Additional and/or alternative procedure steps may be included according to the type of article 24, garment or otherwise. Inspection of accessories, for example, which are attached to the article 24, or inspection of the packaging, as a second example, may be included in the complete inspection procedure 32 by including appropriate sub-routines, similar in structure and function to those described above.

The assembly of software sub-routines 48, 50, 52, 54, 56, 58, 60, 62, 64, 66, 68, 70 into a procedure 32 must be sufficiently flexible as to conveniently permit rearrangement of the sub-routine sequence. Therefore, when a new type of article 24 is being prepared for production and inspection, trials of the inspection procedure 32 are conducted to determine the most efficient sequence by which all the necessary product specifications are checked, and the sequence of sub-routines in the procedure 32 is then re-ordered to follow the empirically-determined most efficient inspection procedure 32.

The software sub-routines 48, 50, 52, 54, 56, 58, 60, 62, 64, 66, 68, 70 are examples of common inspection procedures on common features of manufactured textile articles. Additional examples include a sub-routine for checking the stitching around buttonholes, for checking the stitching in quilting, for checking the color of threads in embroidery. Each appropriate sub-routine, though created for a particular type of article 24 will be useful later for other types of articles and therefore a comprehensive library of these sub-routines enables a new inspection procedure 32 for a new type of article to be quickly assembled.

Some, if not all, steps and sub-routines of the procedure 32 require careful examination of an extended area in which numerous defects may be found if examined thoroughly, but some defects could be missed if the inspection is hasty. The system 20 seeks to prevent the inspector 30 from rushing too fast through such a step by assigning a minimum inspection time by means of the timer 49. Until the minimum time has expired, the system 20 does not accept any inputs indicating a conclusion to this step. Also, as the sequence of steps cannot be altered by the inspector 30, the conclusion to this step must precede the start of all remaining steps. The clock 49 is preferably started 96 by the input which signals the conclusion of the step immediately preceding in the procedure 32. The minimum time setting can be made dependent on the size or complexity of the particular article 24 being inspected, a larger or more complex product requiring a longer minimum inspection time.

Some steps and sub-routines require the inspector 30 to take a measurement or perform a test. The input by the inspector 30 to the system 20 of a measurement or test result may be taken as sufficient evidence that the inspection requirements of that step or task have been fulfilled. For those cases, the preferred embodiment omits the imposition of a minimum duration for execution of the task.

At the conclusion of the inspection, the report is printed out and attached to the article 24 to inform the subsequent production operators. If the inspection determination is to reject the article 24, the conspicuous reject ticket 109 is printed out for attachment to the product label 39 in order to insure all rejected items are easily identified for segregation. If the article routing variable or flag 84 indicates the need for rework as previously described, the printed report 113 will show the type of corrective action required and the location of each type of defect. If no rework is recommended by the inspector 30, the report will show the inspector's comments on findings which were considered worth noting but not so severe as to require rework or merit rejection 108. These comments will be of value to a second inspector 30 or auditor who may be required to give a second opinion on articles treated as "borderline cases".

Preferably, the inspection system 20 includes additional features and characteristics which enhance the utility. For instance, the task, procedure step, or sub-routine being currently addressed by the inspector 30 is distinguished on the screen 34 relative to all preceding and subsequent tasks which are displayed in half-tone or "greyed-out." This helps to focus the inspector's attention on the task in hand. Furthermore, to avoid confusion caused by accidental selections, an "Undo" button on the touch-screen monitor 34 enables the inspector 30 to cancel all his inputs in the current sub-routine and return to the beginning of the current sub-routine. Yet further, progress through the inspection procedure 32 could be accompanied by an audible signal, such as a "beep" whenever a selection is confirmed. This is the system's acknowledgement to the inspector 30 that the most recent input has been accepted. Audible signals from the inspection station 28 also notify the workshop supervisor or administrator 46 that inspections are proceeding.

The inspector's inputs to preceding inspection tasks may be reviewed by scrolling up to the relevant screen display area and using the mouse 40 to indicate the preceding task of interest. The previously-selected response, as well as the related comments previously entered, may be displayed by means of a "mouse-over" method of exhibiting text only when desired by the inspector 30. Thus, each previously-selected response or related comment is associated with a particular area in the task display chart, and the positioning of the pointer, controlled by the pointing device 40, within that area causes the required text to be displayed.

While each inspection station 28 could function as an independent, stand-alone entity, the preferred embodiment comprises a star network of inspection stations connected via a hub 162 to the central server 26. The server 26 provides data storage and security. It also provides inspection flexibility in that an article 24 may be presented at any inspection station 28 for its second, third, and so on inspection, regardless of which station was used for previous inspections.

The present invention improves the quality of each article 24 manufactured by the collection of quality data on that particular article and by the collection and analysis of quality data on the article population of which the particular article is a member. Statistical analysis of the collected data will indicate, for example, which sewing machine operators generate a higher-than-average defect rate as well as which article characteristics are prone to high defect rates, and again, as an example, will identify the inspectors 30 who produce reports which are most closely confirmed by subsequent re-inspection for production audits.

The quality audit function requires equipment similar to the inspection system 20, and follows the procedure 32, except the number of pieces selected for auditing is usually less than one hundred percent of all pieces available for auditing, and the audit follows the entire procedure 32 as though it were the first inspection. Audit reports are maintained separately in the server's files and identified as such, so that they do not override the previous inspection report on the same item. The computer 33 at the audit station is connected to the same server 26 and network as all other inspection station computers 33.

The audit function is usually located in the vicinity of the packing area, where the factory's output is prepared for shipping. Preferably, the audit station 28 performs a secondary role of recording which articles 24, by their unique identification 78, are packed into which carton, as identified by a bar-code label attached to the carton. When the unique article identification 78 is scanned prior to packing, the data accumulated in server 26, by virtue of the preceding inspections 32, is searched to insure the item has been inspected and accepted. If shipment of a non-inspected or non-accepted article is attempted, an alarm mode is triggered, such as disabling the audit station computer 33 until a supervisor 46 enters a password and removes the offending item. The preferable dual role of the audit station 28 connects quality control and shipping. The data server 26 is able to automatically produce detailed packing lists with a confirmed piece count for each carton box.

The system 20 comprises a method of uniquely identifying each article 24 inspected, plus a method of creating and storing inspection records according to the unique identifier 78 allocated to the subject of the inspection record. This permits the thoroughness of inspection to be checked by either or both of two procedures. The first procedure being, duplicate or multiple inspections can occur as a result of the factory's quality assurance plan, such as an arrangement for both substantially one hundred percent final inspection at the end of the production line plus the audit of some of the articles selected at random before they are loaded for shipping. These multiple inspections permit the reports resulting from previous inspections to be compared with the subject article 24 itself. Any discrepancies reveal weaknesses in previous inspections and in particular indicate poor performance on the part of the inspectors 30 involved.

The second procedure being, management 46 or customers can deliberately seed the production line with known defects, confident that the unique identification 78 of each article 24 will permit the defective article to be tracked and withdrawn before it reaches the area for loading and shipping. The seeded defect constitutes a test of the thoroughness of execution of the inspection procedure 32, in that non-discovery clearly indicates poor inspection performance.

While the forms of the invention herein disclosed constitute a presently preferred embodiment, many others are possible. It is not intended herein to mention all the possible equivalent forms or ramification of the invention. It is understood that terms used herein are merely descriptive, rather than limiting, and that various changes may be made without departing from the spirit or scope of the invention

What is claimed is:

1. An inspection system for an article of manufacture comprising:
   at least one computer operative to receive, store and process data, amend software settings, and loading and executing of at least one inspection procedure;
   a first inspection station communicating electronically with the at least one computer, the first inspection station having an input device for entering an article identifier, a monitor screen for displaying a series of questions to be answered and inputted by an inspector in sequential order; and
   a timer integrated into the at least one computer and triggered when a minimum time allocation is called for by a sub-routine of the at least one inspection procedure to prolong an observation by the inspector instructed by the sub-routine thus providing a thorough and complete inspection.

2. The inspection system set forth in claim 1 wherein the inspection station has a key board for entering of alpha-numeric data.

3. The inspection system set forth in claim 2 wherein the monitor screen has a touch-screen interface for making choices prompted by the at least one computer.

4. The inspection system set forth in claim 3 wherein the input device is a scanner which scans the article identifier from a label attached to the article.

5. The inspection system set forth in claim 4 wherein the scanner is a charge-coupled device having an RS232 link.

6. The inspection system set forth in claim 4 wherein the scanner of the first inspection station is a point-of-sale type.

7. The inspection system set forth in claim 2 comprising:
   a second inspection station;
   a computer server of the at least one computer; and
   a hub for linking the first and second inspection stations to the computer server.

8. The inspection system set forth in claim 7 comprising:
   a first computer of the at least one computer being located at the first inspection station for receiving an uploaded inspection procedure of the at least one inspection procedures from the computer server, executing the inspection procedure and downloading of the inspection data to the computer server; and
   a second computer of the at least one computer being located at the second inspection station for receiving an uploaded inspection procedure of the at least one inspection procedures from the computer server, executing the inspection procedure and downloading of the inspection data to the computer server.

9. The inspection system set forth in claim 8 wherein the article of manufacture is a fabric article.

10. The inspection system set forth in claim 2 wherein the first inspection station has a pointing device for entering inspection data to the monitor screen.

11. The inspection system set forth in claim 10 wherein the first inspection station has a microphone for recording verbal comments from the inspector.

12. The inspection system set forth in claim 1 wherein the monitor screen has a touch-screen interface for making choices prompted by the at least one computer.

13. The inspection system set forth in claim 1 wherein the first inspection station is one of a plurality of inspection stations communicating with the at least one computer.

14. The inspection system set forth in claim 1 wherein the article of manufacture is a fabric article.

15. A method of inspecting articles of manufacture comprising the steps of:
   inputting an article identifier and class by an inspector into an inspection station communicating with a computer;
   selecting automatically the correct inspection procedure having a plurality of sequential steps as a computer code for the identified article class;
   displaying the most recent inspection report for the same identifier on a monitor screen of the inspection station if previously inspected;
   initiating a timer and in regards to a specific sub-routine of the inspection procedure by the computer;
   instructing the inspector to perform a particular observation to the article by the computer for the specific sub-routine;
   expiring the timer by the computer;
   entering observation data by the inspector into the inspection station for the specific sub-routine; and
   comparing the observation to a specification stored by the computer.

16. The method of inspecting articles of manufacture set forth in claim 15 wherein the step of entering observation data by the inspector comprises the further steps of:
   presenting pre-programmed comment choices on the monitor screen by the computer for the specific sub-routine;
   selecting a choice by the inspector; and
   storage of the choice by the computer.

17. The method of inspecting articles of manufacture set forth in claim 16 further comprising the steps of:
   processing of the choice by the computer after comparing the observation;
   determining by the computer if the observation data conforms to acceptance criteria;
   flagging of the article by the computer for later rework if the observation data is not acceptable; and
   initiation of the next sequential sub-routine of the procedure by the computer.

18. The method of inspecting articles of manufacture set forth in claim 17 further comprising the steps of:
   reporting of data from the computer in regards to a flag designated for the specific sub-routine;
   reworking of the article;
   re-initiation of the inspection procedure;
   re-inspection of the specific sub-routine that was flagged during the previous inspection; and
   skipping by the computer of sequential sub-routines not flagged and previously inspected.

19. The method of inspecting articles of manufacture set forth in claim 16 further comprising the steps of:
   processing of the choice by the computer after comparing the observation to specified acceptance criteria;
   accepting the observation data as meeting the specification by the computer; and
   initiating the timer for a next sequential sub-routine of the inspection procedure by the computer.

20. The method of inspecting articles of manufacture set forth in claim 16 further comprising the steps of:
   processing of the choice by the computer after comparing the observation;
   rejecting the article; and
   terminating the inspection procedure by the computer.

21. The method of inspecting articles of manufacture set forth in claim 16 wherein the step of entering observation data by the inspector comprises the further steps of:

presenting a pre-programmed map of the article on the monitor screen by the computer prior to the step of storage of the choice;

utilizing a pointing device by the inspector to select a location on the map in regards to an observed defect; and storage of the marked map by the computer.

* * * * *